O. E. WOOLDRIDGE.
POWER TRANSMISSION GEAR.
APPLICATION FILED MAY 26, 1914.
1,141,030.
Patented May 25, 1915.
2 SHEETS—SHEET 1.
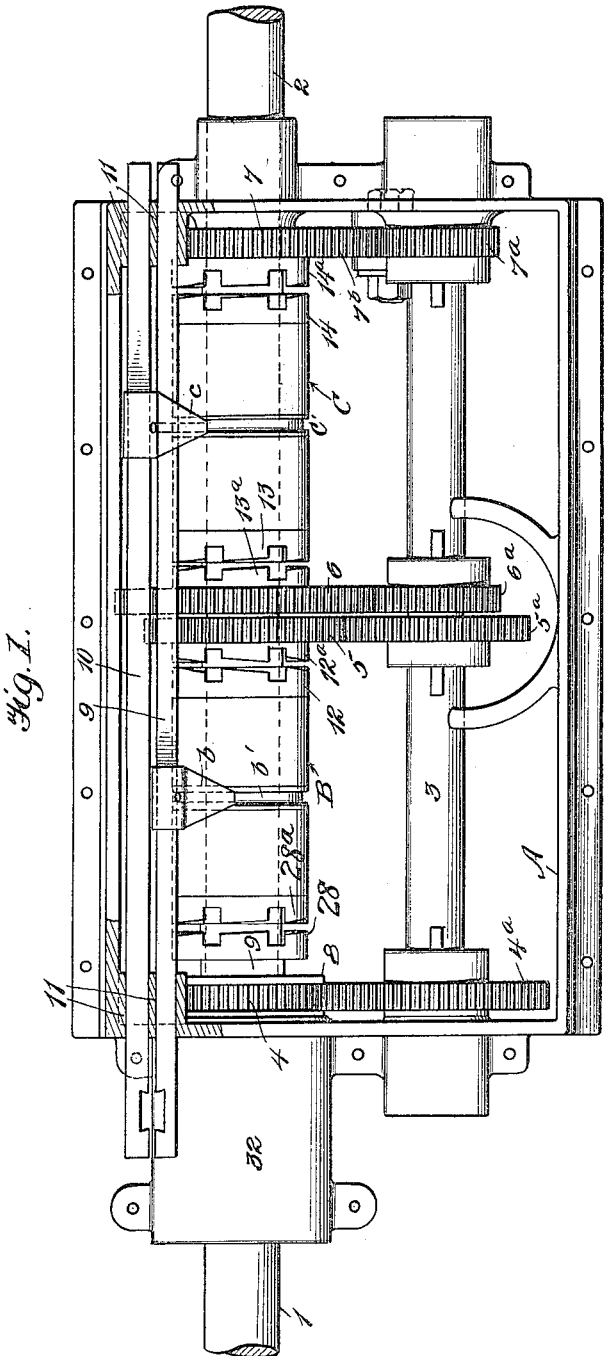
WITNESSES
INVENTOR
ORVILLE E. WOOLDRIDGE
BY
ATTORNEYS

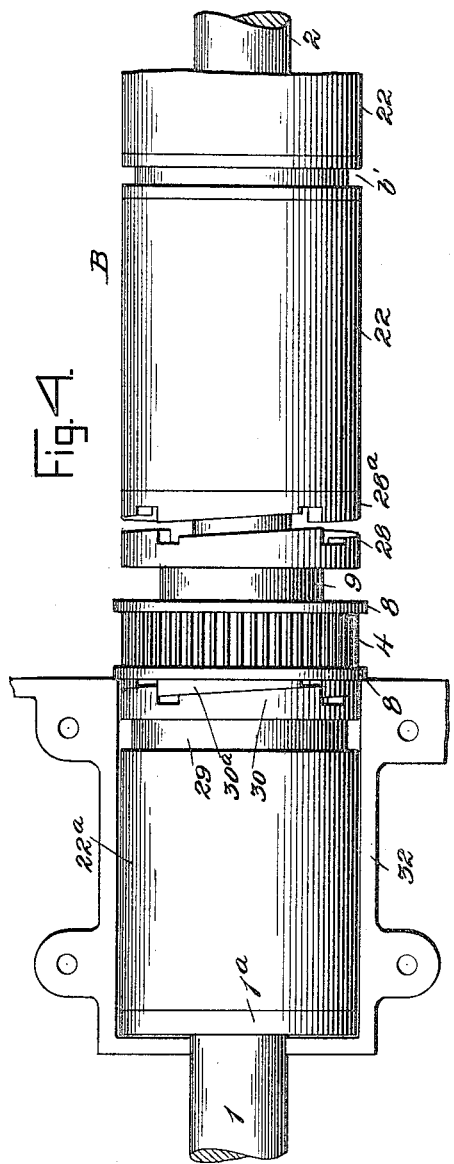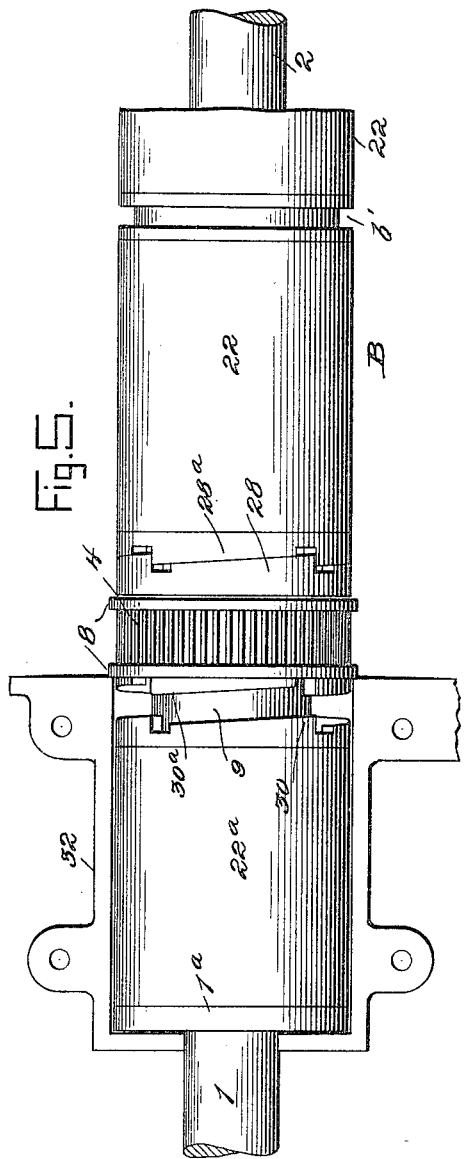

UNITED STATES PATENT OFFICE.

ORVILLE EDWARD WOOLDRIDGE, OF GREENVILLE, ILLINOIS.

POWER-TRANSMISSION GEAR.

1,141,030. Specification of Letters Patent. Patented May 25, 1915.

Application filed May 26, 1914. Serial No. 841,022.

*To all whom it may concern:*

Be it known that I, ORVILLE E. WOOLDRIDGE, a citizen of the United States, and a resident of Greenville, in the county of Bond and State of Illinois, have invented a new and Improved Power-Transmission Gear, of which the following is a full, clear, and exact description.

This invention relates to transmission gears of the variable speed type adapted especially for use in connection with automobiles for transmitting power from the prime mover to the traction wheels, and it has to deal more especially with speed transmitting mechanisms of that character in which a cushioning means is employed to transmit motion from a driving to a driven element, whereby the shocks are eliminated in changing from one speed to another.

The invention has for its general objects to improve and simplify the construction and operation of mechanisms of the character referred to so as to be reliable and efficient in use, and of durable and substantial design.

A further object of the invention is the provision of a novel combination of clutch elements whereby the secondary shaft of the mechanism is normally connected with the engine shaft, so that power can be derived from the latter to drive the driven shaft at any desired speed or in either direction by the throwing in of the appropriate gear and by means of said clutch elements the driven shaft can be directly connected with the engine shaft, and in both instances the cushioning means is operative to cause a gradual communication or cushioned application of power to the driven shaft.

Another object of the invention is the provision of a slidable sleeve having two sets of clutch teeth and connected with the engine shaft through the cushioning and power transmitting spring and adapted in one position to be clutched with a gear which drives a secondary gear-carrying shaft and which in another position is adapted to engage clutch teeth on the driven shaft of the mechanism, whereby power can be transmitted to either the driven or secondary shaft, such sliding sleeve being movable through the said gear, which is of the shrouded type so that by engagement with a gear on the secondary shaft the shrouded gear is held against axial movement so that sliding of the sleeve in one direction or the other will connect the driving shaft with the driven or secondary shaft.

Still another object of the invention is the employment in connection with the construction above specified, of cushioning and power-transmitting means between the driven shaft and the several gears thereon for producing the variation of rotative speed and reversing the direction of travel.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention, and wherein similar characters of reference indicate corresponding parts in all the views, Figure 1 is a plan view of the transmission mechanism with part of the casing removed and showing the variable speed and reversing clutch elements in neutral position; Fig. 2 is a fragmentary sectional view of the master clutch, as it may be termed, with the parts in normal position so that the driving shaft can transmit power to the secondary shaft of the mechanism; Fig. 3 is a partial sectional view showing the parts of the master clutch in position to transmit power directly to the driven shaft; and Figs. 4 and 5 are plan views of the master clutch respectively in position for transmitting power to the secondary shaft and to the driven shaft.

Referring to the drawing, 1 designates the engine or power shaft, 2 the driven shaft and 3 the secondary or intermediate shaft, these shafts being suitably journaled in bearings and extending into the gear casing A, which may be of any suitable design. 4 is a shrouded gear which is normally clutched to the engine or driving shaft so as to receive power therefrom, and loose on the driven shaft 2 are non-sliding gears 5, 6 and 7, and the first two of these gears in turn mesh with gears 5ᵃ and 6ᵃ, keyed to the secondary shaft 3 and gear 7 meshes with an idler gear 7ᵇ that in turn meshes with gear 7ᵃ, there being a gear 4ᵃ meshing with the primary gear 4, whereby the secondary shaft is driven. The gear 4ᵃ enters between the shrouded flanges of the gear 4, so as to prevent the same from shifting axially with the slidable clutch tooth-carrying sleeve 9 on which the gear 4 is mounted. Feathered on the driven shaft 2 to shift longitudinally thereof are elements B and C which are shifted respectively by forks $b$ and $c$ carried by the bars 9 and 10 slidably mounted in bearings 11 of the casing and adapted to be connected with suitable operating devices, the forks engaging in peripheral grooves $b'$ and $c'$ respectively. The element B is adapted to be clutched with the gear 5, so that the shaft 3 can, through the gears 4 and $4^a$, $5^a$ and 5, transmit power to the driven shaft at an intermediate speed, whereas by means of the element C, the shaft 3 can be clutched with the driven shaft through the gears 6 and $6^a$ to obtain the lowest speed, or through gears 7, $7^a$ and $7^b$ to obtain rotation of the driven shaft in the reverse direction. Four-step indental clutch elements 12 and $12^a$ are provided on the element B and adjacent gear 5, respectively, and similar clutch elements 13, $13^a$ and 14, $14^a$ are provided on the member C and gears 6 and 7.

The shifting elements B and C are of the same construction, and, as shown in Fig. 2, each comprises a tubular body 15 provided with a bore for receiving the driven shaft 2, to which the body 15 is connected by a spline 17 to slide axially of the shaft. The body 15 has tubular portions 18 extending in opposite directions therefrom, and surrounding each tubular portion is a helical spring 19 wound from flat stock, and one end of each spring is fitted to a shoulder 20 on the body 15 and fastened thereto. The opposite end of the spring is secured to a ring 21 which is rotatable on the tubular extension 18. The ring 21 in Fig. 2 is a four-step pivotal clutch element and corresponds to the clutch elements 12, 13 and 14, so that power transmitted between the body 15 and clutch elements at either end thereof takes place through an intermediate spring 19, which, by the relative rotation of the body 15 and clutch element at either end thereof, causes the spring to unwind or expand and engage a cylindrical arrester or abutment 22 which surrounds the spring, but which is of a diameter somewhat larger than the normal diameter of the spring. The cylindrical arresters 22 are fastened to the body 15 by screws, pins or other fastenings 23, which serve to anchor the inner ends of the springs to the body 15. The outer ends of the springs are pinned, screwed or otherwise fastened at 24 with the clutch elements on the ends of the extensions 18 of the body 15.

In Fig. 2 one of the shafts is provided with a socket and the other shaft has a reduced portion to enter the socket, whereby the two shafts 1 and 2 change in axial alinement. The shaft 1 is shown as having the socket 25 and this socket has a bushing or lining 26 into which extends the reduced portion 27 of the shaft 2. Surrounding this joint between the shafts is the bushed sleeve 9 that has at one end a set of teeth 28 adapted to engage with the teeth $28^a$ on the sliding device B. On the opposite end of the sleeves from the teeth 28 is threaded a ring 29 which has clutch teeth 30 similar to the other clutch teeth and arranged to engage complementary clutch teeth $30^a$ on the shrouded gear 4. A spring $19^a$ is connected with the ring 29 and through the latter with the sleeve 9, which spring $19^a$ is similar to the other springs 19 and serves the same function, it having the end opposite from the ring 29 connected with the driving shaft 1. This shaft 1 has an enlargement $1^a$ formed with a shoulder 30 to which the spring $19^a$ is fitted, and around this spring $19^a$ is an arrester $22^a$ which is fastened to the shaft 1 by the pins or other fasteners 31 which secure the spring $19^a$ to the shaft. This arrester $22^a$ is free to slide over the ring 29 and to relatively rotate with respect thereto.

As shown in Figs. 2 and 4 the teeth 30 and $30^a$ are normally in engagement, and the spring $19^a$, which, together with the arrester, is arranged in a housing 32 of the crank casing A, Fig. 1, is in normal condition, and consequently the driving shaft 1 imparts rotation to the secondary shaft 3, but as long as the devices B and C are in the position shown in Fig. 1, no power is transmitted to the driven shaft 2. By shifting the devices B and C power, however, can be transmitted to the driven shaft from the intermediate shaft 3 as before mentioned, but in each instance the communication of power takes place through the spring 19, which serves to act to produce a gradual application of power without shock, it being understood that with the first transmission of power from the secondary shaft the spring of that clutch element which is thrown into service will expand, and in expanding communicate power yieldingly to the driven shaft until finally the spring expands to such a point that it engages its surrounding arrester 22, when transmission of power becomes positive. For the low and intermediate speeds and for reverse rotation the double clutch-carrying sleeve 9 is in normal position, as shown in Figs. 2 and 4, but if the highest speed or direct drive is desired, the device B is shifted to the left, Figs. 1 and 5, so that the clutch teeth $28^a$ will be engaged with the clutch teeth 28, and as the movement of the device B is continued farther to the left than is required to engage the teeth 28 and $28^a$, the sleeve 9 will be shifted to the left to disengage the teeth 30 from the teeth $30^a$, whereby the shrouded gear 4 is unclutched and allowed to remain stationary, as will be the condition of all the other gears of the mechanism. During this direct application of power from the driving to the driven shaft the spring 19ª performs its cushioning function until it expands into engagement with the arrester 22ª, as shown in Fig. 3. As soon as the device B is shifted to the right to normal position the spring 19ª will axially expand to engage the teeth 30 again with the teeth 30ª, whereby the gear 4 is connected with the driving shaft.

From the foregoing description taken in connection with the accompanying drawing, the advantages of the construction and method of operation will be readily understood by those skilled in the art to which the invention appertains, and while I have described the mechanism which I now consider to be the best embodiment thereof, I desire to have it understood that the mechanism shown is merely illustrative and that such changes may be made when desired as are within the scope of the appended claims.

Having thus described my invention, I claim as new and desire to secure by Letters Patent:

1. In a variable speed transmission, the combination of a driving shaft, a driven shaft, a secondary shaft, a sleeve slidably mounted on the driving and driven shafts, clutch teeth on the opposite ends of the sleeve and facing in the same direction, a gear loose on the sleeve and having clutch teeth to engage the clutch teeth on one end of the sleeve, a spring connected with the driving shaft and sleeve and through which power is transmitted from the former to the latter, an arrester on the driving shaft for limiting the expansion of the spring, a slidable clutch element on the driven shaft and normally disengaged from the sleeve, means for shifting the slidable clutch element to engage with the sleeve and to disengage the latter from the said gear, whereby the driving and driven shafts are directly connected, and a gear on the secondary shaft normally meshing with the first-mentioned gear, and one of the gears being shrouded for preventing the first-mentioned gear from sliding with the sleeve when the latter is shifted.

2. A power transmitting mechanism of the class described comprising driving and driven shafts arranged in alinement and with their ends together, a sleeve slidable on the shafts at the adjacent ends thereof, clutch teeth on opposite ends of the sleeve and facing in the same direction, a gear surrounding the sleeve and having at one side gear teeth for engaging the gear teeth at one end of the sleeve, a spring for connecting the sleeve with the driving shaft and normally urging the sleeve in a direction to maintain the same clutched to the gear, means carried by the driving shaft for limiting the expansion of the spring, a secondary shaft, a gear on the secondary shaft meshing with the first-mentioned gear, one of the gears being provided with means for maintaining the gears in mesh and preventing the first-mentioned gear from sliding from the sleeve, a clutch element on the driven shaft, a slidable member splined to the driven shaft, a spring connecting the slidable member with the said clutch element and through which the latter transmits rotation to the said member and driven shaft, means on the said member for arresting the expansion of the last-mentioned spring, means for shifting the said slidable member to engage the clutch element with the said sleeve and move the latter to disengage from the first-mentioned gear, and variable speed gears between the driving and secondary shaft.

3. A power transmitting mechanism of the class described comprising a driving shaft, a driven shaft, a secondary shaft, gears between the driven and secondary shafts for variable speed and reverse driving of the driven shaft, a clutch element having two sets of clutch teeth and shiftably mounted, a cushioning and transmitting spring between the driving shaft and clutch element, a gear having clutch teeth with which one set of teeth of the clutch element is maintained normally in engagement by the said spring, and a clutch element on the driven shaft normally disengaged from the other set of clutch teeth of the first-mentioned clutch element and shiftable to engaging position and to shift the first-mentioned clutch element to disengage the same from the gear for transmitting power directly from the driving to the driven shaft.

In testimony whereof I have signed my name to this specification in the presence of two subscribing witnesses.

ORVILLE EDWARD WOOLDRIDGE.

Witnesses:
WILLIAM F. HEBRANK,
BERUS D. TIBBETTS.